United States Patent
Sanz et al.

(10) Patent No.: US 9,486,764 B2
(45) Date of Patent: Nov. 8, 2016

(54) SYSTEM FOR DENSE LOADING OF CATALYST INTO BAYONET TUBES FOR A STEAM REFORMING EXCHANGER-REACTOR USING REMOVABLE HELICAL ELEMENTS

(71) Applicant: IFP Energies nouvelles, Rueil-Malmaison (FR)

(72) Inventors: Elena Sanz, Lyons (FR); Robert Beaumont, Rillieux la Pape (FR); Ghislain Bergeot, Solaize (FR); Christophe Boyer, Charly (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 14/436,731

(22) PCT Filed: Sep. 24, 2013

(86) PCT No.: PCT/FR2013/052240
§ 371 (c)(1),
(2) Date: Apr. 17, 2015

(87) PCT Pub. No.: WO2014/060669
PCT Pub. Date: Apr. 24, 2014

(65) Prior Publication Data
US 2015/0343404 A1  Dec. 3, 2015

(30) Foreign Application Priority Data
Oct. 17, 2012 (FR) .......... 12 02770

(51) Int. Cl.
*B65B 1/04* (2006.01)
*B01J 8/00* (2006.01)
*B01J 8/06* (2006.01)

(52) U.S. Cl.
CPC .......... *B01J 8/003* (2013.01); *B01J 8/002* (2013.01); *B01J 8/06* (2013.01); *B01J 2208/00752* (2013.01)

(58) Field of Classification Search
CPC . B01J 8/002; B01J 8/003; B01J 2208/00778
USPC .......... 141/364, 365; 414/287; 193/32
See application file for complete search history.

(56) References Cited

U.S. PATENT DOCUMENTS 5,247,970 A * 9/1993 Ryntveit .......... B01J 8/003
141/1
6,467,513 B1 * 10/2002 Yanaru .......... B01J 8/002
141/12

(Continued)

FOREIGN PATENT DOCUMENTS

FR  2874212 A1  2/2006
FR  2950822 A1  4/2011

OTHER PUBLICATIONS

International Search Report for PCT/FR2013/052240 dated Feb. 7, 2014.

*Primary Examiner* — Jason K Niesz
(74) *Attorney, Agent, or Firm* — Millen White Zelano and Branigan, PC; Csaba Henter; Anthony Zelano

(57) ABSTRACT

The present invention describes a device and a method for dense and homogeneous loading of catalyst into the annular space of bayonet tubes employed in a steam reforming reactor, said device being constituted by a series of removable helical elements.

14 Claims, 3 Drawing Sheets

(56) References Cited

U.S. PATENT DOCUMENTS

| | | |
|---|---|---|
| 7,828,023 B2 | 11/2010 | Patureaux et al. |
| 8,182,758 B2 | 5/2012 | Oliveira et al. |
| 8,578,978 B2 | 11/2013 | Sanz et al. |
| 2006/0213575 A1* | 9/2006 | McNaughton ........... B01J 8/003 141/286 |
| 2008/0149215 A1 | 6/2008 | Patureaux et al. |
| 2009/0257849 A1 | 10/2009 | Oliveira et al. |
| 2010/0175775 A1* | 7/2010 | Richter ................... B01J 8/002 141/1 |
| 2011/0083769 A1 | 4/2011 | Sanz et al. |
| 2011/0250102 A1* | 10/2011 | Sakai ...................... B01J 8/003 422/198 |
| 2012/0125479 A1* | 5/2012 | Brightling ............... B01J 8/003 141/2 |

* cited by examiner

SYSTEM FOR DENSE LOADING OF CATALYST INTO BAYONET TUBES FOR A STEAM REFORMING EXCHANGER-REACTOR USING REMOVABLE HELICAL ELEMENTS

FIELD OF THE INVENTION

The present invention relates to the field of loading catalytic tubes used in tubular reactors employing highly endothermic or highly exothermic reactions. Thus, the present invention is particularly suitable for a reactor for steam reforming natural gas or various hydrocarbon cuts with a view to producing the $CO+H_2$ mixture known as synthesis gas.

Two major families of steam reforming reactors can be distinguished:

Reactors in which the heat is supplied by a series of burners located inside the reactor, and those in which the heat is supplied via a heat transfer fluid, generally combustion fumes, said combustion taking place outside the steam reforming reactor per se.

Certain reactors of this latter type, which will hereinafter be denoted exchanger-reactors, employ simple tubes. Others use double-walled concentric tubes which are also known as bayonet tubes. A bayonet tube can be defined as an inner tube surrounded by an outer tube which is coaxial with the inner tube, the annular space between the inner tube and the outer tube generally being filled with catalyst. In the remainder of the text, the term "annular space" or "catalytic zone" will be used to designate said annular space defined by the bayonet tubes.

Natural gas, or more generally the hydrocarbon feed, is introduced via the annular zone in a top to bottom flow, and the reaction effluents are collected in the central portion of the internal tube in a bottom to top flow. Introducing the feed via the internal tube and evacuating the reaction effluents via the annular zone 4 is also possible. The present invention is not dependent on the direction of flow of the fluids inside the bayonet tubes.

The reaction for steam reforming natural gas for the production of hydrogen is highly endothermic and thus generally takes place in furnaces or in exchanger-reactors as defined above.

The reaction takes place at very high temperatures, typically 900° C., and under pressures which are typically 20 to 30 bars. Under these conditions, due to the mechanical behaviour of the materials, the reaction can only be carried out under viable economic conditions if it is inside tubes.

Catalytic exchanger-reactors are thus constituted by a multitude of tubes, typically of the order of 200 to 350 tubes for units producing 100000 $Nm^3/h$ of hydrogen, this series of tubes being enclosed in a shell which receives the hot fluid, which means that the heat necessary for the steam reforming reaction can be supplied.

This hot fluid or heat transfer fluid is generally constituted by the fumes from a combustion which has taken place outside the exchanger-reactor.

Thus, the catalyst has to be installed in all of the steam reforming tubes in a regular manner from one tube to another, so that the pressure drop is identical in each tube.

This condition is very important in guaranteeing a good distribution of reagents over the series of catalytic tubes and for preventing one tube from being undersupplied, for example, which could result in major overheating of the material constituting the tube, this overheating substantially reducing the service life of the tube.

Similarly, it is important that no voids, i.e. areas without catalyst or depleted in catalyst, subsist in a tube as again, the tube could overheat locally in the absence of a catalytic reaction inside it. In addition, any heterogeneity in the distribution of the catalyst in the reaction zone could result in an unbalanced flow of reaction fluid or fluids.

Thus, the aim of the device of the invention is to allow loading which is both dense and homogeneous over each of the bayonet tubes forming part of the exchanger-reactor.

EXAMINATION OF THE PRIOR ART

In a conventional reforming furnace, the tubes, which typically have an internal diameter of 10 cm, are conventionally loaded using bags filled with catalyst which are opened over the surface of the bed. This mode of loading is known to the skilled person as "sock loading" and is known not to result in a high loading density.

The tubes are then manually vibrated by being struck with a hammer or a mechanical vibration system, to encourage the grains of catalyst to become properly positioned and minimize the voids and thus increase the loading density. However, excessive vibration might result in rupture of the catalyst grains and a substantial increase in the pressure drop.

However, with this method it is difficult to produce good quality loading and it is generally necessary to repeat the vibration operation several times in order to obtain pressure drops which are similar from one tube to another.

Other improved procedures and equipment have been proposed under the technological term Unidense™ initially developed by Norsk Hydro, or under the technological term Spiraload™ developed by Haldor Topsøe. These technologies are applicable to single tubes, but not to bayonet tubes.

The Applicant's patent FR 2 950 822 describes a solution for loading bayonet tubes with 3 loading tubes, with mechanical brakes or pneumatic braking. That loading method can be used to produce dense, uniform loading of the bayonet tubes. It is a "grain by grain" method and turns out to be too slow and poorly suited for use on the scale of an industrial reactor comprising several hundred tubes.

In general, it could be said that many documents exist in the field of loading catalyst into steam reforming tubes. The majority of them use flexible slowing means or rigid obstacles in the form of an inclined plane.

However, none of the documents found concerns an application to bayonet tubes when an annular zone is loaded, avoiding the central tube.

The device of the present invention can thus be defined as a device for dense loading of catalyst into the annular zone of bayonet tubes provided in a steam reforming exchanger-reactor, the device being used to obtain a homogeneous loading density in each of the tubes of the exchanger-reactor within a time period which is compatible with the demands of industrial scale start-up.

In addition, in a certain number of cases, the device of the invention must be able to be adapted to a variation in the internal diameter of the external tube, imposed by mechanical and thermal stresses which change along the tube, and thus to a change in the dimensions of the annular zone. None of the prior art documents can accommodate this supplemental constraint.

BRIEF DESCRIPTION OF THE INVENTION

Figure 1:
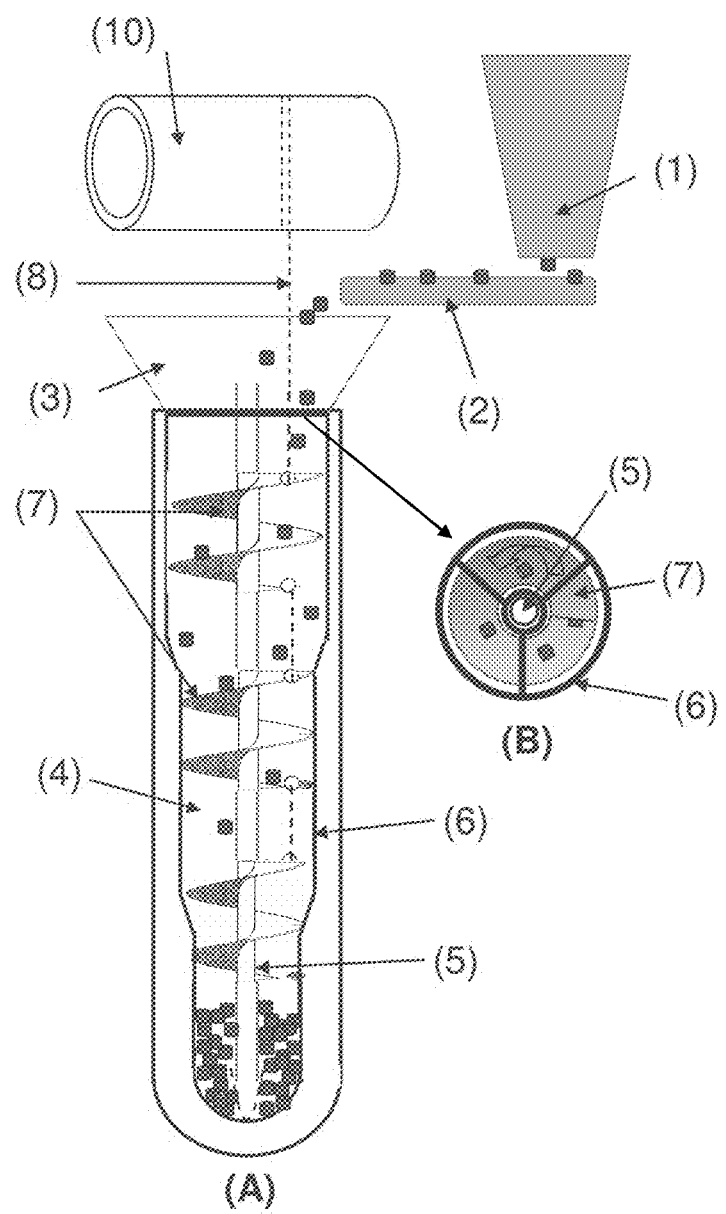
FIG. 1. Illustrates a device in accordance with the invention in the case in which the annular zone of each bayonet tube is divided into 3 loading sectors with identical surface areas formed by the system for holding the central tube in the upper portion of the catalytic tube.
Figure 2:
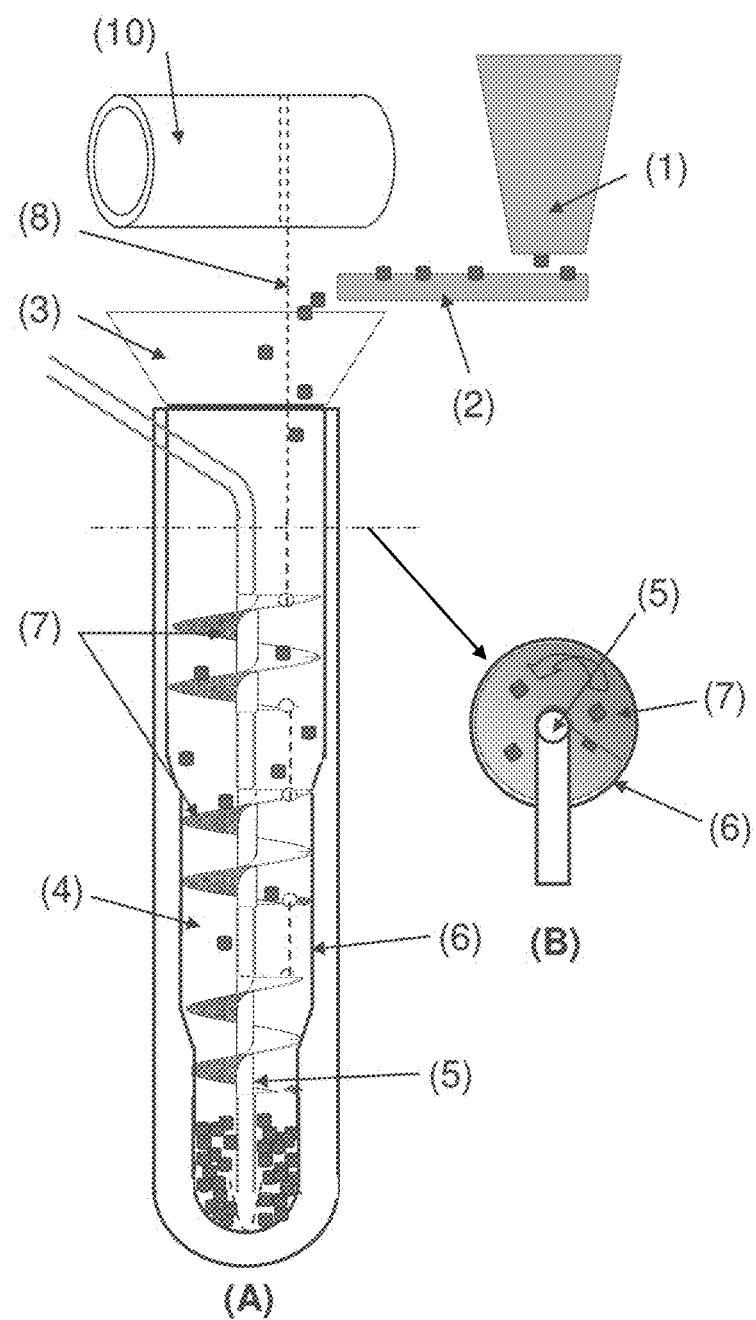
FIG. 2. Illustrates a device of the invention in the case in which the upper portion of the annular zone is traversed by the internal tube 5.
Figure 3:
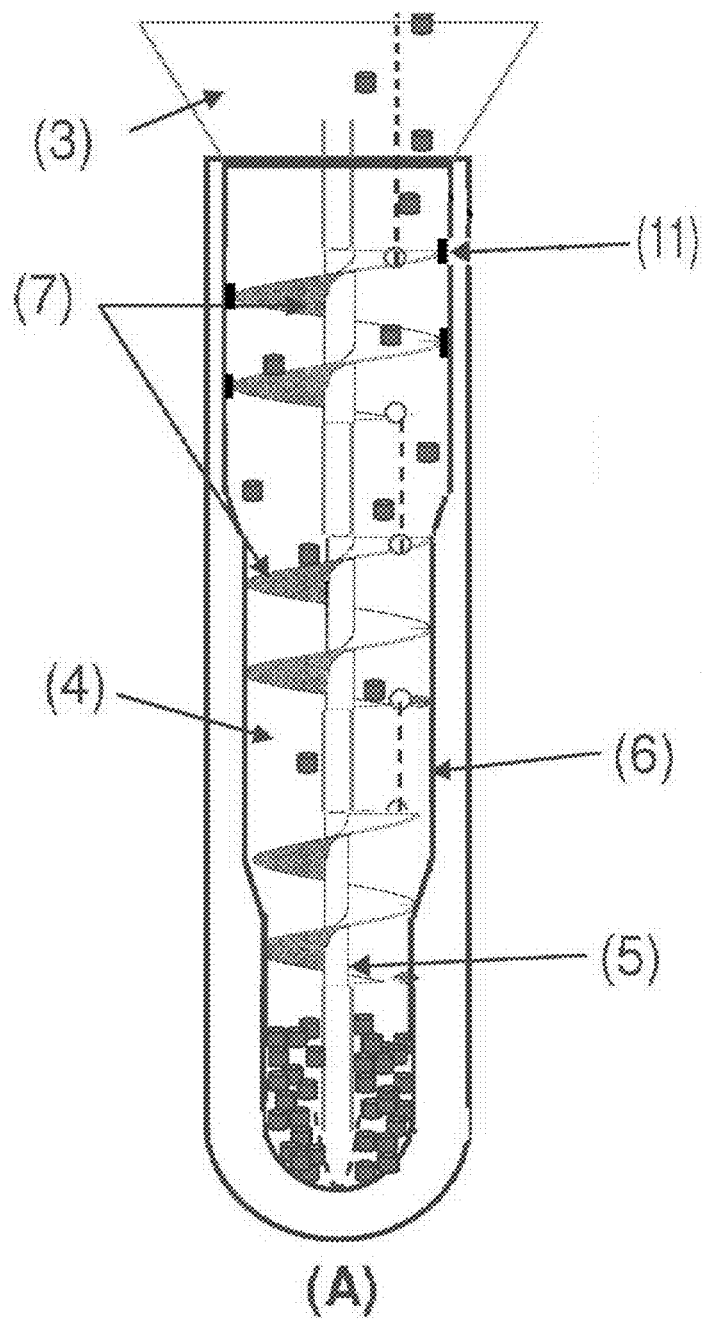
FIG. 3. Illustrates a device in accordance with the invention that is equipped with rubber lips.

The present invention can be defined as a device for densely filling catalyst specially adapted to a steam reforming exchanger-reactor consisting of a plurality of bayonet tubes enclosed in a shell, each bayonet tube comprising an annular zone which is at least partially filled with catalyst. Said catalyst is constituted by particles occupying at least part of the annular space 4 included between an internal tube 5 and an external tube 6, the assembly of these two tubes constituting the bayonet tube, the width of said annular space being in the range 30 mm to 80 mm, and its height being in the range 10 to 20 meters.

The catalyst particles are generally in the form of cylinders with an approximate height of 10 mm to 20 mm and an approximate diameter of 5 mm to 20 mm.

In its basic version, the device of the present invention consists of:
 a series of "shaftless" helical elements connected together in a flexible manner via vertical wires or chains extending between the external rim and the internal rim of two consecutive helical elements.

A helical element is defined by its angle of inclination with respect to the vertical in the range 30° to 60°, preferably in the range 30° to 50°, its height in the range 1 pitch to 1.5 pitch, preferably in the range 1 pitch to 1.3 pitch, and its external diameter which varies as a function of the internal diameter of the external tube 6 such that the device is completely deployed, each helical element occupying the whole of the annular section 4.

The vertical distance separating two consecutive helical elements is in the range 50 cm to 150 cm.

Each helical element is said to be "shaftless" because there is no rigid tube occupying the internal space of each helical element.

The notion of the "pitch" of a helix should be understood to be within its usual definition of the vertical distance corresponding to one revolution of the helix.

In its basic version, the annular space 4 of each bayonet tube forms a continuous space and only its upper portion contains the obstacle constituted by the internal tube 5 traversing the external tube 6. This obstacle does not cause any problems for deployment of the device of the invention. It can readily be bypassed, correctly engaging the various helical elements during deployment of the device.

In the version in which the internal tube 5 is centred by a centralizer, this obstacle can also readily be bypassed by the device of the present invention.

In the case in which the internal diameter of the external tube 6 has variations defining portions of the external tube 6 with a decreasing diameter from top to bottom of the bayonet tube, the system of helical elements 7 is adapted to this variation in section by using helical elements with a smaller diameter at the periphery, with flexible rims, for example formed from rubber, fixed to the external rim of the smaller diameter helical element.

When placing the device in position, the flexible peripheral rims are forced against the wall of the external tube 6, then as and when the device is raised, the flexible rims spread out so as to remain in contact with the internal wall of the external tube 6, even over the upper sections with a larger diameter.

A ballast may then be added to the bottom of the chain to force the system to descend into the smaller diameter portion.

The present invention also concerns a method for loading a catalyst using the device described above, which method can be broken down into the following series of steps:
 the loading system is initially wound into the external spooler 10, the feed hopper 1 being filled with solid;
 the loading system is then gradually introduced into the annular zone 4 via its upper portion until the first helical element 7 reaches a distance with respect to the bottom of the tube in the range 50 cm to 100 cm;
 the conveyor belt or shaker conveyor 2 is started up so as to provide a flow rate of solid in the range 250 to 500 kg/h, the solid particles being introduced into the annular zone 4 via the funnel 3;
 as and when the tube is filled, the loading system is raised in the annular zone 4 with the aid of the external spooler 10 in a manner such as to keep a constant distance between the first helical element 7 and the surface of the bed which is gradually being constituted, said distance being in the range 50 cm to 100 cm;
 the system is wound up at a speed equivalent to the speed of loading of the tube, in the range 0.2 m/min to 0.4 m/min;
 once the tube has been loaded and the loading system wound up, the system is displaced in order to load the next tube.

DETAILED DESCRIPTION OF THE INVENTION

The present invention can be defined as a device for the dense loading of catalyst into the annular space 4 of bayonet tubes, each bayonet tube having a height in the range 10 to 20 m, an external diameter in the range 250 mm to 150 mm, and an external diameter of the internal tube 5 in the range 10 to 40 mm.

The annular space containing the catalyst thus has a characteristic width of approximately 50 mm. In practice, depending on the case, the characteristic width of the annular space 4 can vary between 80 and 30 mm.

In addition, in some cases, the external tube 6 has a diameter which decreases from top to bottom in sections, which therefore means that the characteristic width of the annular space 4 also reduces going from top to bottom. The device of the invention must therefore adapt itself to these variations in characteristic width and retain its performance over the whole series of sections.

The grains of catalyst are generally in the form of cylinders approximately 10 mm to 20 mm in height and 0.5 cm to 2 cm in diameter.

One of the problems posed by them being loaded into tubes more than 15 meters in length is the risk of these grains breaking if they are allowed to simply fall freely without taking any precautions; this is one of the solutions of the prior art for producing a dense loading.

Other problems are linked to the geometry per se of the annular catalytic space, which prohibits the passage of conventional loading systems.

In a frequent case in the context of the present invention, the internal tube 5 which traverses the external tube 6 has to be accommodated in the upper portion of the annular zone 4 in order to allow the reaction effluents to leave in a completely unobstructed manner.

The helical elements 7 can be used to bypass this obstacle naturally during positioning of the device, simply by engaging the helical element below the obstacle and allowing said element to turn until it has completely passed by below the obstacle.

As indicated in the prior art, the risk of arching over is accentuated when the ratio between the diameter of the tube and the principal dimension of the particles is less than 8, which is often the case in the context of the present invention, since the typical width of the annular space (50 mm) equates to about 4 times the characteristic diameter of the particles of catalyst.

The device of the present invention considerably reduces the risk of the formation of arches, since the solid particles will flow gradually in contact with the helical elements and finish by having to traverse a drop height with respect to the bed being formed of at most 1 m.

Finally, loading is carried out tube by tube, and so it has to be sufficiently rapid for industrial use, because a steam reforming reactor aimed at a production of approximately 100000 Nm$^3$/h of H$_2$ generally includes approximately 200 to 350 bayonet tubes.

This set of constraints is satisfied by the dense filling device of the present invention which can be defined as follows:

The present invention describes a device for dense filling of catalyst into a steam reforming reactor, consisting of a plurality of bayonet tubes enclosed in a shell, the catalyst being constituted by solid grains occupying at least a portion of the annular space included between an internal tube and an external tube, the assembly of these two tubes constituting a bayonet tube. The steam reforming exchanger-reactor to which the present invention applies is constituted by approximately 300 identical bayonet tubes with a height in the range 12 to 20 meters, the series of these bayonet tubes being enclosed in a shell which may reach 10 meters in diameter.

The width of the annular space included between the internal tube and the external tube of a bayonet tube is in the range 30 mm to 80 mm, and its height is in the range 12 to 20 meters. The particles of catalyst are generally in the form of cylinders with a height of approximately 5 mm to 20 mm and a diameter of approximately 10 mm to 20 mm.

The annular space defined in this manner may be unitary or divided into several substantially identical sectors using a system known as a "centralizer" which can be used to initially centre the internal tube 5 within the external tube 6. Thus, a sector is defined as a portion of the annular space which corresponds to a clearly defined fraction of the annular section and extends over the whole height of said annular space.

The filling device of the invention consists of:
  a series of helical elements 7 distributed vertically along the length of the annular space 4 in a regular manner, each helical element 7 having a length in the range 1 to 1.5 pitches of the helix, preferably in the range 1 to 1.3 pitches of the helix, and the elements 7 being separated by a vertical distance in the range 50 cm to 150 cm;
  said helical elements 7 being connected together via a chain 8 which is wound around a spooler 10 located outside the tube to be filled, and the particles of catalyst being contained in:
    a central feed hopper 1 for delivering the particles onto a conveyor belt 2 supplying the annular space 4 by means of:
      a funnel 3 via which the particles flow into the interior of the annular space 4.

Each helical element 7 is in the shape of a plane which is inclined downwardly at an angle alpha with respect to the vertical in the range 30° to 60°, preferably in the range 30° to 50°. In a variation of the device of the present invention, the helical elements can be alternated and may be of the "left handed" and "right handed" type, depending on the direction of rotation of the inclined plane.

When the diameter of the wall of the annular space 4 is varied, due to portions of the external tube 6 having a decreasing internal diameter from top to bottom, the system of helical elements 7 is provided, at its ends closest to the wall of the annular space 4, with lips formed from rubber (11) which can be used to adjust the width of the inclined plane so as to obtain a contact with the internal wall of the annular space 4.

In order to facilitate the descent of the device inside the annular zone, it is possible to equip the first helical element with weights which can be used to overcome the friction of the rubber lips (11) at the wall of the external tube 6. The first helical element 7 is that which is always placed nearest to the surface of the catalytic bed which is being formed.

Concerning the loading method using the device as described above, it can be described by the following steps:
  the loading system is initially wound into the external spooler 10, the feed hopper 1 being filled with solid;
  the loading system is then gradually introduced into the annular zone 4 via its upper portion until the helical element 7 reaches a distance with respect to the bottom of the tube in the range 50 cm to 100 cm;
  the conveyor belt 2 is started up so as to provide a flow rate of solid in the range 250 kg/h to 500 kg/h;
  as and when the tube is filled, the loading system is raised from the annular zone 4 with the aid of the external spooler 10 in a manner such as to keep a constant distance between the last deflector and the surface of the bed which is gradually being constituted. This distance is in the range 50 cm to 100 cm. The system is therefore wound up at a speed equivalent to the speed of loading of the tube, in the range 0.2 meter/min to 0.4 meter/min;
  during loading, the feed hopper 1 can be refilled if its volume is less than that of the tube. This operation can be carried out with or without stopping the loading;
  once the tube has been loaded and the loading system wound up, the system is displaced in order to load the next tube;
  operations for checking loading with the aid of pressure drop measurements between two points of the bayonet tube accompany the loading operation, but are not described in this text as they are considered to be familiar to the skilled person.

EXAMPLE OF THE INVENTION

Loading tests were carried out with the device of the invention constituted by two helical elements with the same direction of rotation on an experimental 2 m high column, constituted by an internal tube with an external diameter of 42 mm and an external tube with an internal diameter of 128.1 mm.

The solid particles to be loaded were in the shape of small cylinders with a height of 1.5 cm and a diameter of 0.8 cm.

Two helical elements with a height of 200 mm and with an angle of inclination with respect to the vertical of 50° were introduced into the column, at a distance of 60 cm from each other.

The distance between the first helical element and the surface of the bed which was being formed was maintained at 50 cm during loading. Thus, the device was continuously raised at a speed of 0.2 meter/min.

Once the bed had been loaded, the ΔP was measured with an air flow rate of 116 $Nm^3/h$.

After discharging, the broken particles were isolated. The breakage percentage was observed and was very low, of the order of 1%.

The results of loading are shown in Table 1 below.

The loading obtained with the device of the invention was highly satisfactory, with an excellent reproducibility in terms of the pressure drop (standard deviation±1%).

The maximum loading time was 5 minutes/meter, which corresponded to a time of approximately 1 hour for a 12 m tube (for a flow rate of solid of approximately 200 kg/h).

The loading density was 959 kg/h, which was reproducible across all of the loading operations carried out.

TABLE 1

Results of loading with a helix system on a 1 m high column.
Air flow rate for pressure drop measurement = 116 $Nm^3/h$.

| Loading time (min) | Discharge time (min) | Shaker conveyor speed | Height of solid (cm) | Loading density (kg/m³) | Pressure drop (mm H₂O) | Standard deviation |
|---|---|---|---|---|---|---|
| 4'40" | 7'20" | 4 | 102 | 959 | 208 | −0.97% |
| 4'30" | 7'00" | 4 | 102 | 959 | 206 | 0.00% |
| 5'00" | 9'19" | 4 | 102 | 959 | 204 | 0.97% |
| 4'50" | 7'55" | 4 | 102 | 959 | 206 | 0.00% |
| 4'20" | 8'10" | 4 | 102 | 959 | 206 | 0.00% |

The invention claimed is:

1. A device for densely filling catalyst specially adapted to a steam reforming exchanger-reactor containing a plurality of bayonet tubes enclosed in a shell, the catalyst being constituted by particles occupying at least a portion of the annular space (4) included between an internal tube (5) and an external tube (6), the assembly of said two tubes constituting a bayonet tube, the width of said annular space being in the range 30 mm to 80 mm, and its height being in the range 10 to 20 meters, the particles of catalyst being in the form of cylinders with an approximate height of 10 mm to 20 mm and an approximate diameter of 10 mm to 20 mm, the device containing:
   a series of shaftless helical elements (7) distributed vertically along the length of the annular space (4) in a regular manner with a length in the range 1 to 1.5 pitches of the helix, said elements being separated by a vertical distance in the range 50 cm to 150 cm;
   said helical elements (7) being connected together via a chain (8) which is wound around a spooler (10) located outside the tube to be filled, and the particles of catalyst being contained in:
     a central feed hopper (1) for delivering the particles onto a conveyor belt (2) supplying the annular space (4) by:
     a funnel (3) via which the particles flow into the interior of the annular space (4).

2. The filling device according to claim 1, in which each helical element has a length in the range 1 pitch of the helix to 1.3 pitches of the helix.

3. The filling device according to claim 1, in which each helical element (7) is in the form of a plane inclined downwardly at an angle alpha with respect to the vertical in the range 30° to 50°.

4. The filling device according to claim 1, in which two successive helical elements (7) have reversed directions of rotation, one being "left handed" and the other being "right handed".

5. The filling device according to claim 1 in which, when the diameter of the wall of the annular space (4) varies because of the internal diameter of portions of the external tube (6), the system of helical elements (7) is provided, at its ends nearest to the wall of the annular space (4), with lips formed from rubber which can be used to adjust the width of the inclined plane in a manner such as to obtain a contact with the internal wall of the annular space (4).

6. The filling device according to claim 5, in which the helical element which is nearest to the bed of particles is equipped with weights which can be used to overcome the friction of the rubber lips on the wall of the external tube (6).

7. A method for loading catalyst using the device according to claim 1, comprising the following series of steps:
   initially winding the loading system into the external spooler (10), the feed hopper (1) being filled with solid;
   the loading system is then gradually introduced into the annular zone (4) via its upper portion until the first helical element (7) reaches a distance with respect to the bottom of the tube in the range 50 cm to 100 cm;
   the conveyor belt (2) is started up so as to provide a flow rate of solid in the range 250 kg/h to 500 kg/h, the solid particles being introduced into the annular zone (4) via the funnel (3);
   as and when the annular zone (4) is filled, the loading system is raised in the annular zone (4) with the aid of the external spooler (10) in a manner such as to keep a constant distance between the first helical element and the surface of the bed which is gradually being constituted, said distance being in the range 50 cm to 100 cm;
   the system is wound up at a speed equivalent to the speed of loading of the tube, in the range 0.2 in/min to 0.4 m/min;
   once the tube has been loaded and the loading system wound up, the system is displaced in order to load the next tube.

8. A device according to claim 1 for densely filling catalyst specially adapted to a steam reforming exchanger-reactor consisting of a plurality of bayonet tubes enclosed in a shell, the catalyst being constituted by particles occupying at least a portion of the annular space (4) included between an internal tube (5) and an external tube (6), the assembly of said two tubes constituting a bayonet tube, the width of said annular space being in the range 30 mm to 80 mm, and its height being in the range 10 to 20 meters, the particles of catalyst being in the form of cylinders with an approximate height of 10 mm to 20 mm and an approximate diameter of 10 mm to 20 mm, the device consisting of:
   a series of shaftless helical elements (7) distributed vertically along the length of the annular space (4) in a regular manner with a length in the range 1 to 1.5 pitches of the helix, said elements being separated by a vertical distance in the range 50 cm to 150 cm;
   said helical elements (7) being connected together via a chain (8) which is wound around a spooler (10) located outside the tube to be filled, and the particles of catalyst being contained in:

a central feed hopper (1) for delivering the particles onto a conveyor belt (2) supplying the annular space (4) by:
a funnel (3) via which the particles flow into the interior of the annular space (4).

9. The filling device according to claim 8, in which each helical element has a length in the range 1 pitch of the helix to 1.3 pitches of the helix.

10. The filling device according to claim 8, in which each helical element (7) is in the form of a plane inclined downwardly at an angle alpha with respect to the vertical in the range 30° to 50°.

11. The filling device according to claim 8, in which two successive helical elements (7) have reversed directions of rotation, one being "left handed" and the other being "right handed".

12. The filling device according to claim 8 in which, when the diameter of the wall of the annular space (4) varies because of the internal diameter of portions of the external tube (6), the system of helical elements (7) is provided, at its ends nearest to the wall of the annular space (4), with lips formed from rubber which can be used to adjust the width of the inclined plane in a manner such as to obtain a contact with the internal wall of the annular space (4).

13. The filling device according to claim 12, in which the helical element which is nearest to the bed of particles is equipped with weights which can be used to overcome the friction of the rubber lips on the wall of the external tube (6).

14. A method for loading catalyst using the device according to claim 8, comprising the following series of steps:
initially winding the loading system into the external spooler (10), the feed hopper (1) being filled with solid;
the loading system is then gradually introduced into the annular zone (4) via its upper portion until the first helical element (7) reaches a distance with respect to the bottom of the tube in the range 50 cm to 100 cm;
the conveyor belt (2) is started up so as to provide a flow rate of solid in the range 250 kg/h to 500 kg/h, the solid particles being introduced into the annular zone (4) via the funnel (3);
as and when the annular zone (4) is filled, the loading system is raised in the annular zone (4) with the aid of the external spooler (10) in a manner such as to keep a constant distance between the first helical element and the surface of the bed which is gradually being constituted, said distance being in the range 50 cm to 100 cm;
the system is wound up at a speed equivalent to the speed of loading of the tube, in the range 0.2 m/min to 0.4 m/min;
once the tube has been loaded and the loading system wound up, the system is displaced in order to load the next tube.

\* \* \* \* \*